United States Patent [19]

Shenk

[11] Patent Number: 4,513,392
[45] Date of Patent: Apr. 23, 1985

[54] METHOD AND APPARATUS FOR GENERATING A REPETITIVE SERIAL PATTERN USING A RECIRCULATING SHIFT REGISTER

[75] Inventor: William H. Shenk, Acton, Mass.

[73] Assignee: Honeywell Information Systems Inc., Waltham, Mass.

[21] Appl. No.: 381,999

[22] Filed: May 25, 1982

[51] Int. Cl.³ ............................................... G06F 3/00
[52] U.S. Cl. .................................................. 364/900
[58] Field of Search ... 364/200 MS File, 900 MS File; 365/73, 78, 81, 83, 85; 360/54

[56] References Cited

U.S. PATENT DOCUMENTS

| | | | |
|---|---|---|---|
| 3,713,113 | 1/1973 | Kohzuma et al. | 365/73 |
| 3,944,989 | 3/1976 | Yamada | 364/900 |
| 3,987,415 | 10/1976 | Boyd | 364/900 |
| 4,026,402 | 5/1977 | Byrd | 364/900 X |
| 4,048,625 | 9/1977 | Harris, Jr. et al. | 364/900 |

*Primary Examiner*—Raulfe B. Zache
*Attorney, Agent, or Firm*—William A. Linnell; Nicholas Prasinos

[57] ABSTRACT

A method and apparatus for generating a repetitive serial pattern using a recirculating shift register. Use of a recirculating shift register during a disk formatting operation permits a reduction in the amount of memory contained in a peripheral controller that would otherwise be required to format the disk prior to its being available for normal write and read operations.

12 Claims, 6 Drawing Figures

| MEMORY ADDRESS (DECIMAL) | MEMORY CONTENTS (HEXIDECIMAL) | | |
|---|---|---|---|
| 0 | 'A1' | } ID AM | |
| 1 | 'FE' | | |
| 2 | CYL | — CYLINDER NO. | |
| 3 | HD | — HEAD NO. | } ID FIELD |
| 4 | SEC | — SECTOR NO. | |
| 5 | '00' | — CRC 1 | |
| 6 | '00' | — CRC 2 | |
| 7 | '00' | | |
| 8 | '00' | | |
| 9 | '00' | | |
| 10 | | } GAP 2 | |
| | 12 X '00' | | |
| 21 | | | |
| 22 | 'A1' | } DATA AM | |
| 23 | 'F8' | | |
| 24 | | | |
| | 256 X '00' | 256 BYTES USER DATA | } DATA FIELD |
| 279 | | | |
| 280 | '00' | — CRC 1 | |
| 281 | '00' | — CRC 2 | |
| 282 | '00' | | |
| 283 | '00' | } BEGINNING OF GAP 3 | |
| 284 | '00' | | |

METHOD AND APPARATUS FOR GENERATING A REPETITIVE SERIAL PATTERN USING A RECIRCULATING SHIFT REGISTER

RELATED APPLICATIONS

The following patent applications, which are assigned to the same assignee as the instant application, have related subject matter and are incorporated herein by reference.

| TITLE | INVENTORS | SERIAL NUMBER |
|---|---|---|
| Method and Apparatus For Addressing A Peripheral Interface By Mapping Into Memory Address Space | William H. Shenk | 373,062 |
| Method and Apparatus For Defining Magnetic Disk Track Field Lengths Using A Programmable Counter | William H. Shenk | 382,000 |

BACKGROUND OF THE INVENTION

1. Field of the Invention

This invention relates to data processing systems; and more specifically to a method of controlling the transferring of data between a peripheral device and a peripheral controller in a data processing system.

2. Description of the Prior Art

Current data processing systems have a wide variety of peripheral devices which are used to input, output and store information processed by the system. These peripheral devices include CRT terminals, card readers, magnetic tape units and various types of disk devices. Among the disk peripheral devices, there are various types including those which have rigid platters, and those which have flexible platters on which the information is recorded. Among the rigid disk devices there exists several types—those which permit the recording media to be removed from the drive unit and those which have a non-removable recording media. A disk device may contain both a removable and a non-removable recording media. A recent development in the rigid disk device category includes a non-removable cartridge in which the recording surface is enclosed and some of these devices are known as Winchester type disks. The flexible disks are also known as floppy disks and are usually removable from the disk drive itself. These disk drives are usually interfaced to the data processing system via means of a peripheral controller which contains the logic which controls the reading and writing of information from or to the recording media.

Information is recorded on a disk in units of data known as sectors. Depending upon the exact format used to record the data, usually more than one sector is recorded in a given track of the disk. The beginning and ending of the track is usually determined by a track index mark which is a notch on the edge of the disk. Therefore, logic is usually provided such that upon the detection of the track index mark, the sector to be read will be located by reading the information on the track until the proper sector is found. Once the proper sector is located, the information to be transferred will either be written onto the disk or read from the disk in the located sector.

Although most disks have used this index mark to indicate the beginning of a track, there is a wide variety of formats used for recording data on disk devices. These various methods of recording data on disk devices can be classified as to whether they are hard sectored or soft sectored.

A disk device is referred to as being a hard sectored device if the information is recorded in physically defined blocks of data, referred to as sectors, on the recording media. For example, in a hard sectored disk, the disk may contain a series of holes which are detected by the disk drive and one sector of information is recorded between a starting and ending sector hole. Therefore, in a hard sector disk there is a sector hole which defines the beginning of each sector such that a single sector may consist of an identification (ID) field and a data field contained in the sector between two sector holes.

In a soft sectored disk format there is usually an ID field delineated by a unique address mark for each sector on the disk. The address mark is actually detected by the hardware by violating the coding rules for encoding the information that is written on the disk. For example, if the information is recorded on the disk using a modified frequency modulation (MFM) technique, the address mark will be recorded on the disk in violation of the MFM recording rules such that the violation will be detected by the hardware. In disks which are soft sectored, the identification field which is preceeded by an address mark is usually followed by a data field which is also preceeded by an address mark. This results in an address (ID) field and a data field associated with each soft sector. Using this soft sectored format, it is possible to have any number of sectors per track since there is no hardware mark on the disk to indicate the beginning of a sector. This soft sectored format permits many sectors having short data fields or a few sectors having long data fields to be recorded within a given track. Using the soft sectored format, the identification field usually contains information which uniquely identifies the sector by recording a sector number within the ID field. Therefore, using the soft sectored format, the peripheral disk controller must be able to read the ID field and detect when the sector of interest is being read as determined by the ID field which is recorded within the sector. This is to be contrasted with the hard sector format in which the number of sector holes past the index mark can be used to determine which sector is currently being accessed.

Before a disk can be used to perform normal reads and writes of user data, the disk must usually be initialized by a formatting operation which lays down on the disk the initial values of the identification fields, data fields and gaps between fields or sectors. This is particularly the case for soft sectored disks which require that the identification fields and data fields be initialized so that a normal read or write operation can locate the specified sector. One technique for formatting soft sectored disks is to write the complete track at one time initializing all sectors within that track in one revolution of the disk. This technique can require that sufficient memory to contain one complete track's worth of information be available so that the memory can be initialized with the information required to write one complete track. Once the memory is initialized, a block transfer write to the disk is initiated upon the detection of the track index mark. This transfers consecutive words, often containing a repetitive data pattern, from the memory to the disk until the complete track has been written out from the beginning of the detection of the track index mark until its second occurrence as the disk revolves. Unfortunately, this technique requires a memory sufficiently large to hold multiple sectors of information and results in a memory which is underutilized because, in the performance of normal read or write operations, a single sector disk read or write can be done using a much smaller memory containing a single sector of information.

Another problem which is often encountered in disk controllers is the requirement that a single disk controller handle a wide variety of disk devices. For example, a controller may be required to be able to read or write from a Winchester type disk and also be required to read or write from a floppy disk. In addition, there may be a variety of densities which can be used to record the information on the disk media. For example, it is now common to have both single and double density floppy disks within a single system and the format used to record the information on a single density floppy disk may vary from that of a double density floppy disk and will be different from that of a Winchester type disk. The requirement that a single controller handle this wide variety of disk formats can require that very complex logic be provided to handle the various counting operations which are required to detect the beginning and end of various ID, data and gap fields that are recorded on the disk. Therefore, what is required is a technique which will allow a single disk controller to be used with a wide variety of formats. This same technique can be used to perform the various formatting read and write operations found even within a single disk format.

OBJECTS OF THE INVENTION

Accordingly, it is an object of the present invention to provide a system in which a block of data containing a repeated pattern can be transferred to a peripheral device without requiring the complete block to be present before the transfer is initiated.

It is another object of the present invention to provide logic that allows different formats of blocks of data to be transferred with a minimal number of combinational logic elements to control the transfers as a function of the different block formats.

It is a further object of the present invention to provide logic that allows for flexible block formats to be utilized but yet still allows for the fast transfers of blocks of data.

It is a still further object of the present invention to provide a low cost peripheral controller.

This invention is pointed out with particularity in the appended claims. An understanding of the above and further objects and advantages of this invention can be obtained by referring to the following description taken in conjunction with the drawings.

SUMMARY OF THE INVENTION

A method and apparatus for generating a repetitive serial pattern using a recirculating shift register. Use of a recirculating shift register during a disk formatting operation permits a reduction in the amount of memory contained in a peripheral controller that would otherwise be required to format the disk prior to its being available for normal write and read operations. The processor in the peripheral controller initializes the memory to contain a subset of the data to be written on the disk during the disk formatting operation. Once the memory is initialized, units of data are transmitted from the memory to the disk drive with a parallel to serial conversion taking place in the shift register. The processor in the peripheral controller is placed in a wait state until all units of data are transferred from the memory to the disk. When the last unit of data in the memory is to be written onto the disk, the last word is recirculated within the parallel to serial shift register that is used to convert the data into a serial bit stream to be written onto the disk. During the time that the last unit of data in the memory is recirculating in the shift register, the processor updates the memory to contain the data necessary to initialize the next subset of data to be written onto the disk. After the last unit of data from the memory is recirculated a predetermined number of times, the recirculation is halted and data is again taken from the memory so that it can be transferred to the disk as the next subset. During the time that the data for the next subset is taken from memory, the processor is again placed in the hold state until such time as the last word in the memory begins to be recirculated at which time the memory contents is again updated by the processor for the following subset. This method provides that the memory is alternately accessed by either the processor or by the shift register, but not both at the same time so that the memory is available to the shift register when data is being transferred at a fast data rate to or from the disk.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

DESCRIPTION OF THE PREFERRED EMBODIMENT

Figure 1:
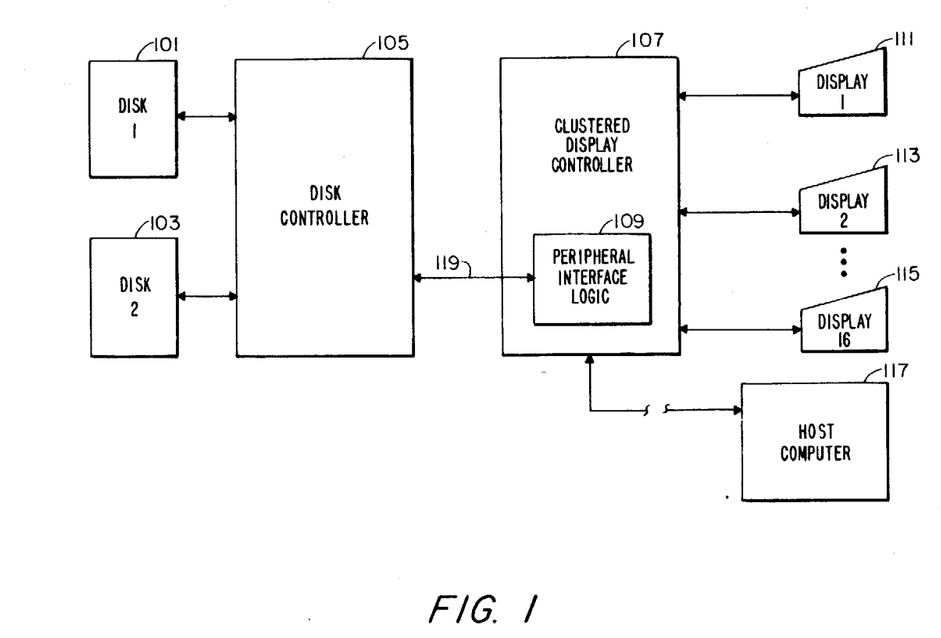
FIG. 1 is a block diagram of a clustered display controller system containing the present invention.

The method and apparatus of the present invention is incorporated into the disk controller of the system illustrated in FIG. 1. FIG. 1 illustrates a clustered display system capable of controlling up to 16 displays, display 1 111, display 2 113 through dislay 16 115. Displays 1 through 16 are connected to clustered display controller 107 such that data entered from a keyboard of the display may be transmitted via clustered display controller 107 to a host computer 117. Conversely, the data originated in host computer 117 may be displayed on displays 1 through 16 via display controller 107. Clustered display controller 107 may be located in relatively close proximity to host computer 117 or may be remotely located with transmission between the clustered display controller 107 and host computer 117 taking place over telephone lines connecting the two.

Disk controller 105 is coupled to clustered display controller 107 to provide local storage of information and programs used by the clustered display controller 107. The transfer of information to and from the disk controller 105 to clustered display controller 107 takes place via peripheral interface logic 109 within clustered display controller 107. In the preferred embodiment, disk controller 105 is capable of having one or two disk devices, disk 1 101 and disk 2 103. In the preferred embodiment, disk 1 101 and disk 2 103 may be configured as follows: a single Winchester type disk drive, one Winchester type disk drive and one floppy disk drive, or two floppy disk drives.

In the preferred embodiment, disk controller 105 is a microprocessor based controller which may be up to ten feet from the clustered display controller 107. Disk controller 105 does all of the data retrieval, read/write head positioning, and status updating required by the disk operating system software which is resident and executes in the clustered display controller 107. Communications between the clustered display controller 107 and disk controller 105 is done via by a byte parallel interface 119 which is protected by a parity bit. Peripheral interface logic 109 in clustered display controller 107 acts as an instruction decoder and a dual ported memory. An application program executing in the clustered display controller 107 may access a command area or a status in the buffer memory of peripheral interface logic 109 as well as the data area. This dual ported memory is shared between disk controller 105 and the clustered display controller 107 and is the vehicle by which all but the most basic commands are passed to disk controller 105. Disk controller 105 periodically scans the dual ported memory in the peripheral interface logic 109 for new commands and updates the status accordingly.

Figure 2:
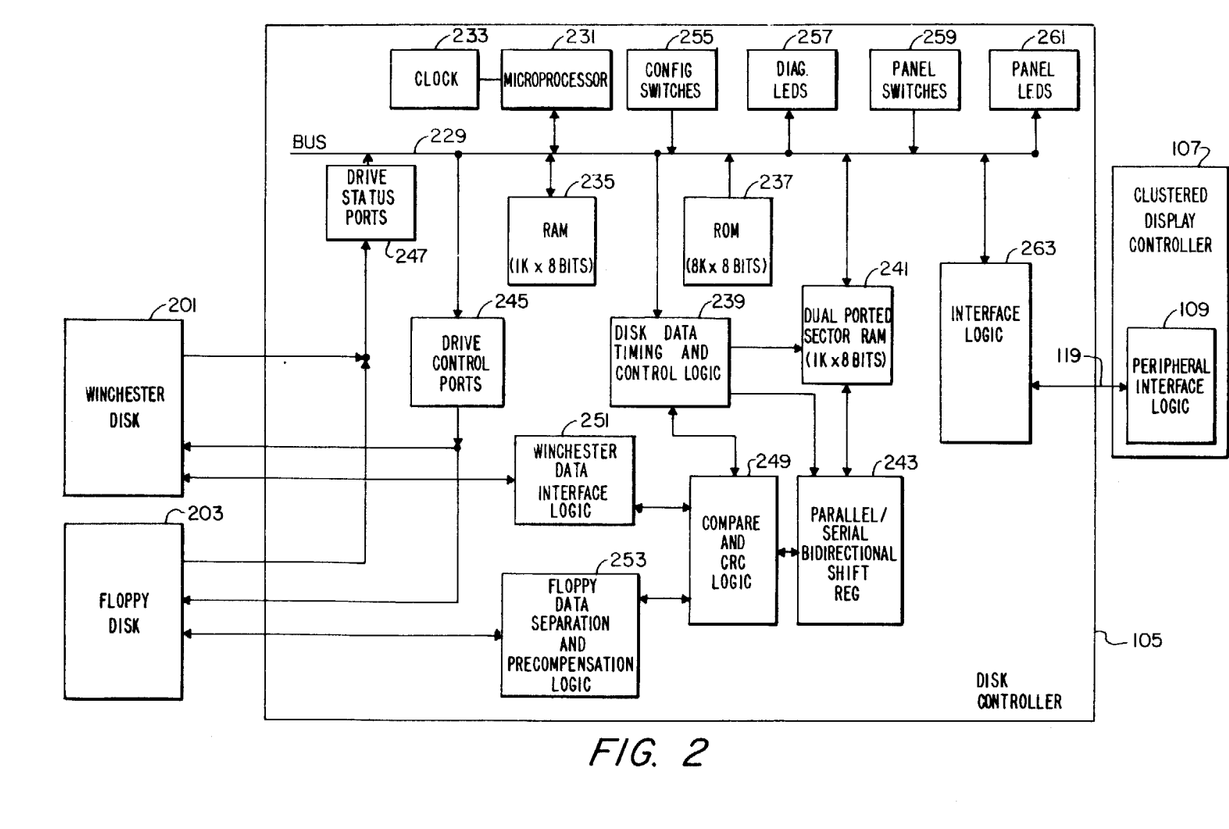
FIG. 2 is a logic block diagram of the disk controller of the system shown in FIG. 1.

Disk controller 105 will now be described in more detail with reference to FIG. 2. Microprocessor 231 controls all head positioning, data transfer and status functions to the disk drives attached to disk controller 105. In FIG. 2, disk drive 1 is shown as being an Winchester disk 201 and disk drive 2 is shown as being a floppy disk 203. Microprocessor 231, in addition to controlling disk 201 and 203, also controls the interface logic 263 which controls the transfer of commands and data between disk controller 105 and clustered display controller 107.

In the preferred embodiment, microprocessor 231 is an Intel 8085A microprocessor which is an 8-bit parallel central processing unit and is described in the Intel publication entitled, *MCS-80/85 Family User's Manual*, copyrighted 1979, which is incorporated herein by reference. Clock 233 is coupled to microprocessor 231 and provides the basic clock frequency utilized by microprocessor 231. Read only memory (ROM) 237 is an 8K (1K equals 1024) by eight bit memory which contains programs (or microprograms) executed by microprocessor 231.

2K of ROM 237 is used for diagnostic programs and the remaining 6K of ROM 237 is used for the disk controller operating system firmware.

Configuration switches 255 are manually set when the disk subsystem is configured to indicate the types of disk drives (Winchester or floppy disk) actually attached to the disc controller 105. Diagnostic light emitting diodes (LEDs) 257 are 8 diagnostic indicators that are used to indicate the status of the disk subsystem as determined by the execution of the diagnostic programs stored in ROM 237. Panel LEDs 261 are indicating lights located on the front panel which are used to indicate whether the disk subsystem is in a bootstrap mode, which of the two possible disk drives is selected and error conditions. Panel switches 259 are operator selectable switches which are used to write protect information stored on the disks, to indicate which of the two possible disk drives are to be used for bootstrapping the disk subsystem, and to reset the disk controller and cause the microprocessor 231 to begin executing the disk controller firmware at location 0.

Bus 229 represents the data, address and control busses which connect microprocessor 231 with other components of disk controller 105. Random access memory (RAM) 235 is a writable memory used as a workspace by the disk controller operating system firmware. This 1K by 8 bit memory is used to contain images of the control area found in the dual ported memory located in the peripheral interface logic 109 of the clustered display controller 107. Disk data timing and control logic 239 provides the timing and control of data going to or from disks 201 and 203. Dual ported sector RAM 241 is a 1K by 8 bit memory that is used to store sectors of disk data which are being written onto disk 201 or 203 or sectors of disk data read from disk 201 or 203. Dual ported sector RAM 241 is used as an intermediate storage of the disk data as it is transferred between clustered display controller 107 and disks 102 and 103.

Parallel/serial bidirectional shift register 243 is used to convert the data from 8 parallel bits to a serial bit stream as the data goes from dual ported sector RAM 241 to disks 201 and 203 and to convert it from a serial bit stream to 8 parallel bits as the data comes from disks 201 and 203 and is stored in dual ported sector RAM 241. Comparator and CRC logic 249 is used to check and generate cyclic redundancy checks (CRC) characters as the data is transferred between the disk and the dual ported sector RAM 241 and also allows a comparison between the data stored in dual ported RAM 241 and the data from either disk 201 or 203. Winchester data interface logic 251 is the interface logic which contains differential drivers and receivers for data being written onto or being read from Winchester disk 201. Floppy data separation and precompensation logic 253 performs the data separation and precompensation functions required of data going to or from floppy disk 203 in either single or double density mode.

As discussed hereinbefore, disk 201 is illustrated in FIG. 2 as being a Winchester type disk and disk 203 is illustrated as being a floppy disk. In the preferred embodiment as described hereinbefore, disk controller 105 can be configured to have either a single Winchester disk and/or a single floppy disk or it can be configured to have two floppy disk drives. If two floppy disk drives are configured in the system, disk 201 would be the second floppy disk and, instead of being connected to Winchester data interface logic 251, it would be connected to floppy disk separation and precompensation logic 253.

Drive status ports 247 provide status information from disk drives 201 and 203 which consists of drive ready, track 0 detection, and write protection indicators. Drive control ports 245 contain the logic associated with stepping the disk read/write heads, the write gate, the read gate, and the in case of the Winchester disk which can have up to 4 read/write heads, the selection of the read/write head.

Figure 3:
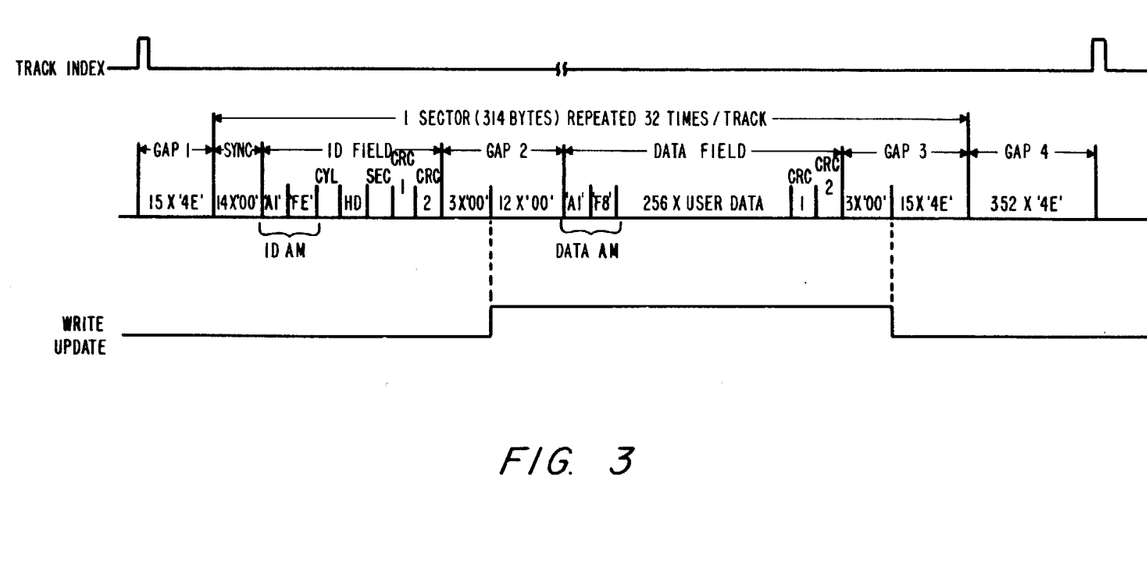
FIG. 3 illustrates the track format of a soft sectored Winchester type disk that is used by the system shown in FIGS. 1 and 2.

The operation of the logic illustrated in FIG. 5 will now be discussed in conjunction with the formatting of a Winchester type disk. The format of the data on Winchester disk 201 is illustrated in FIG. 3. The Winchester drive 201 consists of either one or two non-removable platters. Each platter provides two usable surfaces, each with its own read/write head. A single platter unit contains two heads (1 for the top surface and 1 for the bottom surface), a two platter unit contains four heads. The platters are composed of 256 cylinders. A cylinder is the path over which the heads pass during one revolution of the platters. One cylinder contains all the data that can be accessed without moving the read/write lead radially on the platters. The cylinder closest to the outside edge of the platter is cylinder 00. The innermost cylinder is 225. A track contains all the data accessed by a single head in a single cylinder.

Each track is divided into 32 sectors which are numbered sequentially 0 to 31. The format is a soft sectored format (i.e., sectors are delineated by information recorded on the track and not by physical sector index marks). Each sector is divided into an (ID) field followed by a data field. Each of these fields is preceeded by a unique address mark (AM). The encoding method used is modified frequency modulation.

FIG. 3 shows the track/sector format. A description of each of the fields follows: The SYNC field is a stable data pattern of all 0's to allow the phased locked loop data separator to acquire lock on the read data. An address mark preceeds both the ID and data fields. It is 2 bytes in length with the first byte always an A1 (hexidecimal, base 16 notation indicated in FIGS. 3, 4A and 4B by single quotes around the numbers) followed either by an FE(16) which defines an ID address mark or by an F8(16) which defines a data address mark. The A1(16), i.e., base 16, pattern is made unique to any other serial bit combination, violating the encoding rules of MFM by omitting one clock bit. CYL is a single byte which indicates the cylinder address. 00(16) indicates the outermost cylinder and FF(16) the innermost cylinder for a total of 256 cylinders. HD is a single byte which indicates the head address. A one platter disk has 2 heads, and a 2 platter disk has four heads. The head address range is 00(16) to 03(16) for a total of 4 heads. SEC is a single byte indicating the sector address. The number of sectors per track is 32. The sector address range is 00(16) to 1F(16). CRC 1 and CRC 2 are two bytes of cyclic redundancy check bits generated by the controller in order to detect errors. The polynomial used is $X(16)+X(15)+X(2)+1$ on both the ID field and the data field. The data field is 256 bytes of user provided data.

Gap 1 immediately follows the track index mark. This field consists of 15 bytes of 4E(16). The track index mark is generated by photo electrically detecting a notch in the edge of the platter. This track index signal as illustrated in FIG. 3 is supplied by the disk drive once each revolution to indicate the beginning of all tracks on a disk drive. Gap 2 separates the ID field from the data field. It provides a known area for the data field write update splice to occur. The remainder of this field also serves as the synchronization area for the data field address mark. This gap contains 15 bytes of 00(16). Gap 3 is a speed variation tolerance area for the sector. It consists of 15 bytes of 4E(16). Gap 4 is the speed tolerance area for the entire track. It consists nominally of 353 bytes of 4E(16).

The total nominal track capacity is 10416 bytes. The minimum track is the nominal track capacity adjusted for a minimum 3 percent speed variance and is therefore 10102 bytes. The write update signal illustrated in FIG. 3 shows the amount of data within a sector that is updated each time a sector of data is written on the disk.

During normal read or write operations from or to the disk, data is read from the disk or written to the disk one sector at a time. For the Winchester disk, this allows the user to read or write 256 bytes of information at one time. However, before a user can perform a normal read or write operation from or to the disk, the disk must be completely initialized. Initialization consists of writing on the disk, the track format illustrated in FIG. 3 so that each sector of each track of each cylinder is written onto the disk. During this formatting operation, it is necessary that during one pass of the track under the write head to write all of the ID fields and gaps associated with that track onto the disk.

As mentioned before, this could be done by having a memory with sufficient capacity to hold all of the bytes associated with one track and initializing the memory to contain the image of the track format. Then, on the detection of the track's index mark, the first word could be read from the memory and written onto the disk and consecutive words read and written until the index mark is again detected. However, this approach would require, in the case of a Winchester disk, in the preferred embodiment, a memory containing 10,416 bytes of data. In the preferred embodiment this required capacity of 10,416 bytes greatly exceeds the 1,024 bytes of memory available in dual ported sector RAM 241. Therefore, in the preferred embodiment instead of writing the total track format in one single pass, all of the ID fields are written in a first pass and the even sector data number fields are written during a second pass and the odd numbered sector data fields are written in a third pass. By splitting the format operation into three passes, the 1,024 bytes of information available in the dual ported sector RAM 241 is more than sufficient to format the disk and to do normal read and write operations from and to the disk. This ability to format a disk by initializing individual tracks using less memory than contained in one track and is made possible by the logic illustrated in FIG. 5.

In the preferred embodiment, incrementing address register 566 is comprised of 3 cascaded Texas Instruments type SN74LS193 synchronous 4-bit up/down counters to form a 10-bit address register and shift/storage register 504 is a Texas Instruments type SN74LS299 8-bit universal shift/storage register. Both of these components are described in the Texas Instruments publication entitled, *The TTL Data Book For Design Engineers*, Second Edition, copyrighted 1976, which is incorporated herein by reference. In the preferred embodiment, CRC generator 528 is a Fairchild type 9411 CRC generator/checker described in their data sheet entitled 9411 *CRC Generator/Checker*, copyrighted 1978, which is incorporated herein by reference.

Figure 4A:
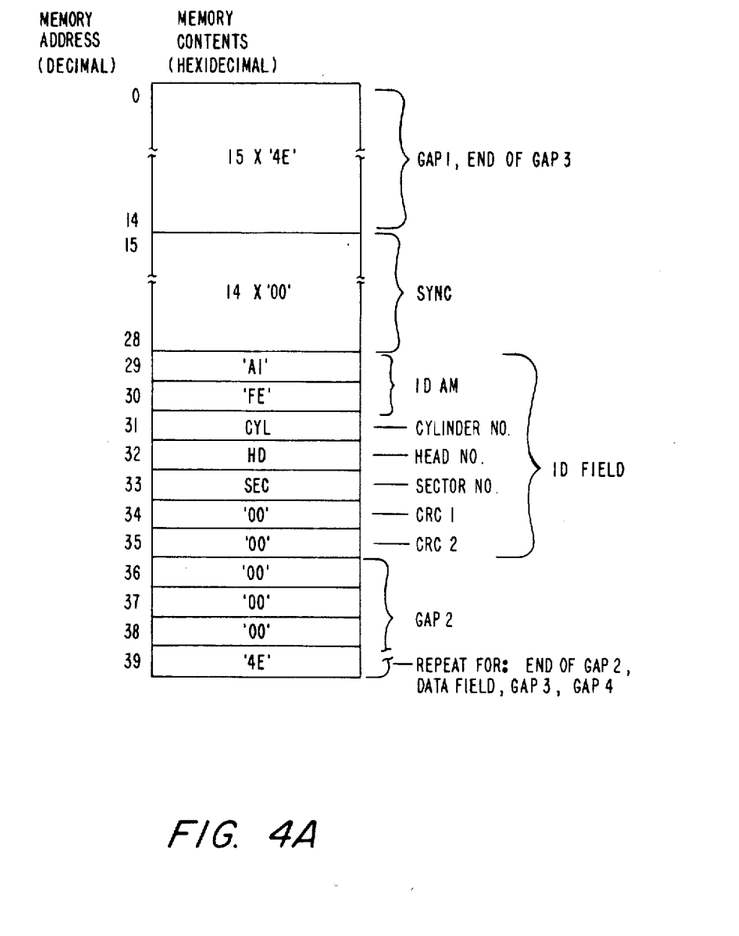
FIG. 4A illustrates the memory contents during pass 1 of a formatting operation used to initialize the track format shown in FIG. 3.
Figure 4B:
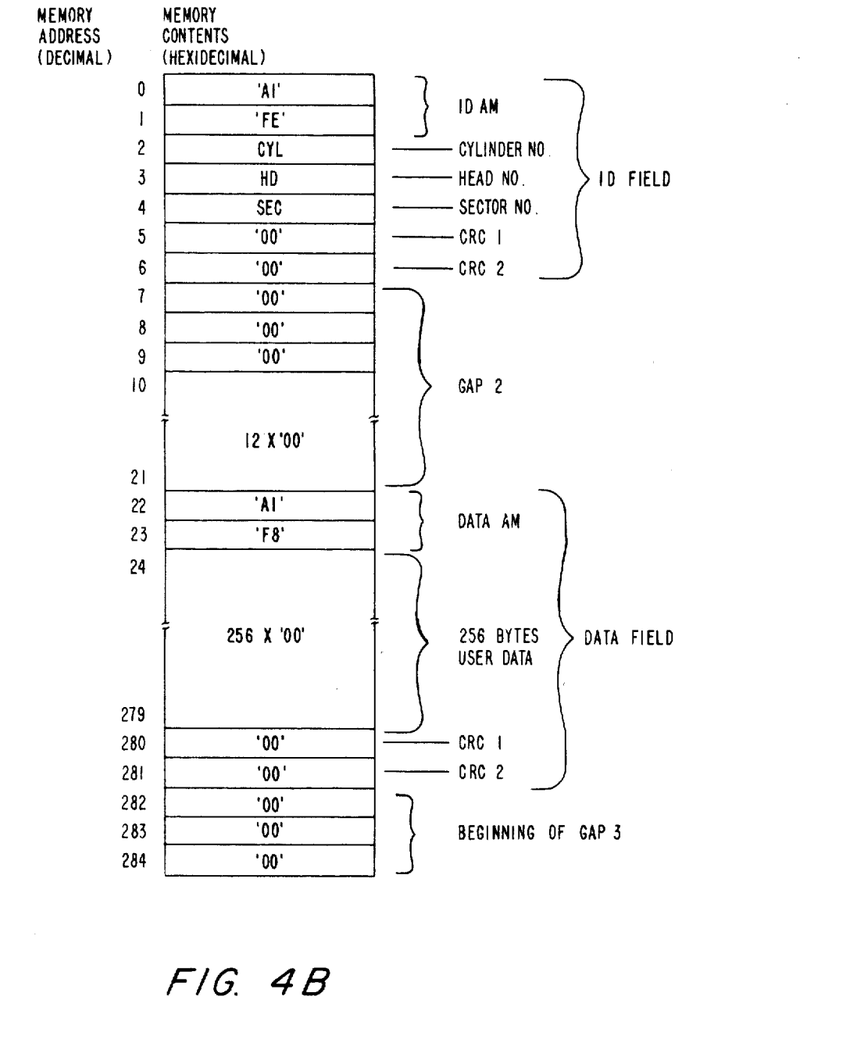
FIG. 4B illustrates the memory contents during passes 2 and 3 of a formatting operation used to complete the initialization of the track format shown in FIG. 3.
Figure 5:
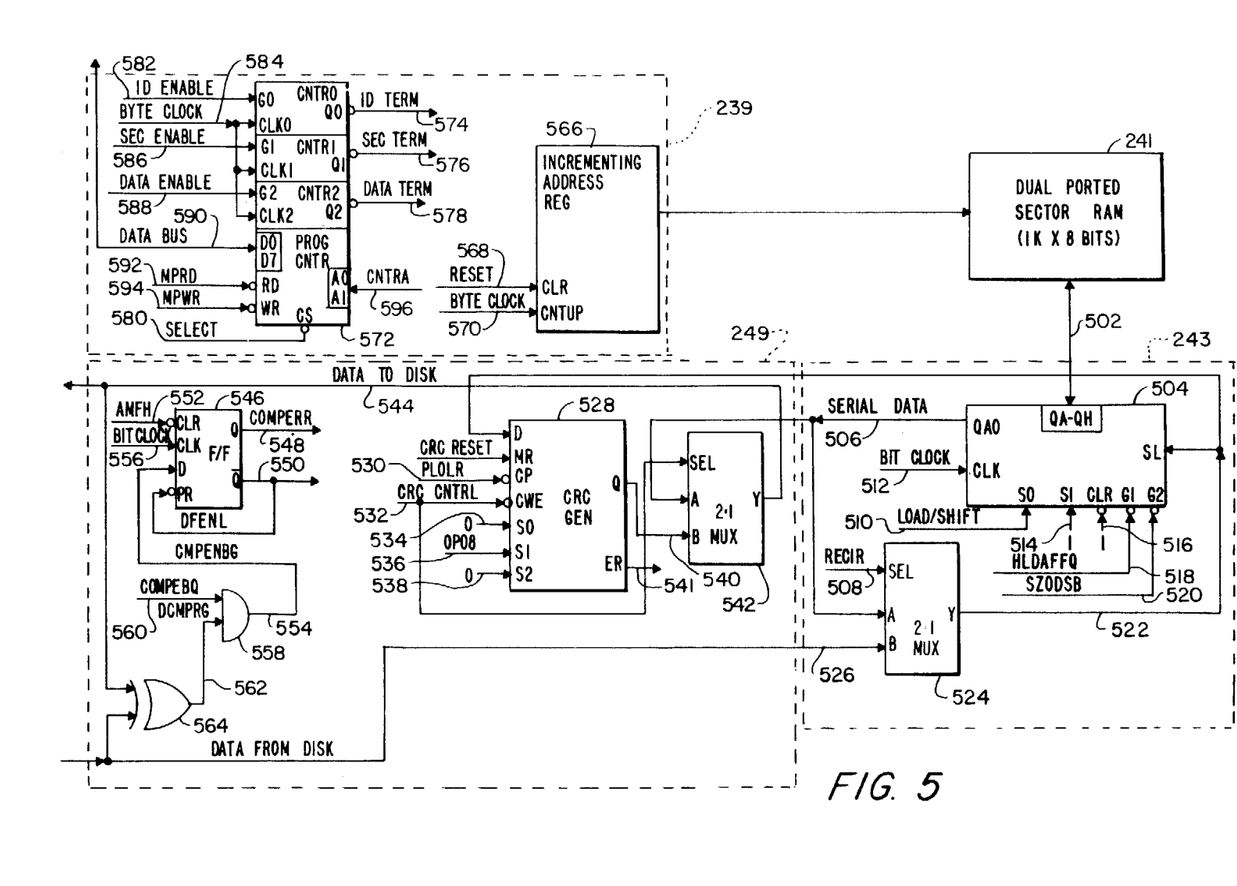
FIG. 5 is a more detailed logic block diagram of a portion of the system shown in FIGS. 1 and 2 and illustrates the present invention.

The logic illustrated in FIG. 5 permits the dual ported sector RAM 241 to be initialized to the contents shown in FIG. 4A for writing the ID fields during the first pass and to the contents shown in FIG. 4B to write the second portion of gap 2, the data field, and the first portion of gap 3 as shown by the amount of data written during a write update in FIG. 3.

FIG. 4A will now be discussed in detail. FIG. 4A illustrates the contents of dual ported sector RAM 241 as set up for the first pass of a formatting operation being performed on a Winchester disk 201. Prior to the initiation of the first pass of the formatting operation, microprocessor 231 initializes dual ported sector RAM 241 to contain the information shown in FIG. 4A in memory location 0 through 39. After the microprocessor has set up dual ported sector RAM 241 to contain the data shown in FIG. 4A, the microprocessor initializes a series of counters in disk/data timing control logic 239 and initializes incrementing address register 566 to address location 0 of dual ported sector RAM 241. Once these preliminary steps are completed, microprocessor 231 is placed in the hold mode thereby preventing it from doing further operations on dual ported sector RAM 241 and also tri-stating the bus 229. The actual data transferred to the disk then begins under the control of disk/data timing and control logic 239 in conjunction with parallel/serial bidirectional shift register 243 and comare and CRC logic 249 which is shown in greater detail in FIG. 5.

Once the microprocessor is put in the hold state and the writing of the first pass of the format initiated, the disk controller waits until Winchester data interface logic 251 signals the detection of the track index mark on the disk. Once the track index mark is detected, the 8-bit byte of the first location from dual ported sector RAM 241 as addressed by incrementing address register 566 is transferred via lne 502 to be loaded into shift/storage register 504 by the load/shift signal on line 510 at the function select (SO) input being in the load state and the S1 input on line 514 being in the binary ONE state. Once loaded with the first byte of data, shift/storage register 504 is clocked by bit clock signal on line 512 at the clock (CLK) input and the serial data stream appears on line 506 one bit at a time at the QAO output. The serial bit stream on line 506 is fed to the data (D) input of cyclical redundancy check generator 528 via multiplexer 524 and to the A input of 2 to 1 multiplexer 542. The clear (CLR) input of shift/storage register 504 is not used and is therefore connected to a binary ONE on line 516. The output control inputs G1 and G2 are respectively connected to signals HLDAFFQ and SZODSB on lines 518 and 520 and are used to disable the eight input/output terminals QA to QH by placing them in the high-impedance state when data is not being transferred between shift/storage register 504 and dual ported sector RAM 241.

At this point in time, multiplexer 542 is selected such that the data at the A input appears at the Y output thereof and therefore the serial data stream appears on line 544 as data to the disk which is then processed by Winchester data interface logic 251 which performs the modified frequency modulation function before it is written onto Winchester disk 201. As each bit of the data is written onto the disk, the bit clock signal on line 512 clocks shift/storage register 504 and performs the parallel to serial conversion by shifting one bit of data out. After eight bits have been shifted out of shift/storage register 504, the byte clock signal on line 570 at the count-up (CNTUP) input of incrementing address register 566 and increments to the next memory location so that the next memory location from dual ported RAM 241 will be available for loading into shift/storage register 504 under the control of load/shift signal on line 510.

This process continues until location 29 starts to be transferred bit by bit to the disk. Location 29, which contains A1(16), is the first byte of the ID field and requires that reset signal CRC RESET on line 598 at the master reset (MR) input to CRC generator 528 be removed so that the cyclical redundancy check may be computed on the ID field. The binary ZERO signals on lines 534 and 538 at the S0 and S2 polynominal select inputs along with signal OP08 on line 536 at the S1 polynominal input selects which polynominal is used to compute the cyclic redundancy check characters. The CRC generator 528 is clocked by bit clocking signal PLOLR on line 530 at the clock (CLK) input. Computation of the CRC is enabled by signal CRC CNTRL on line 532 at the check word enable (CWE) input being in the binary ONE state. This same signal is connected to the select (SEL) input and used to select between the A and B inputs of multiplexer 542 so that as long as the CRC is being generated, the data on line 506 is multiplexed onto line 544 as data to the disk and after the CRC is computed, the data from the output of CRC generator 528 on line 540 will be multiplexed onto line 544 as the data to the disk.

Having initiated the computation of the cyclical redundancy check for characters, bytes 29 through 33 are transferred to the disk a bit at a time as described above. When byte 34 is to be transferred, which is intialized to a 00(16) byte in dual ported sector RAM 241, instead of taking the data from line 506 which appears at the A input of multiplexer 242, signal CRC CNTRL CRCCNTRL on line 532 which appears at the select (SEL) input of multiplexer 542 selects that the B input data appear at the Y outputs thereof such that the bits of data generated by the CRC generator 528 which appear at the Q output thereof will be transferred to the Winchester disk. After the first byte of the two byte cyclical redundancy check has been transferred to the disk, the second byte is output by CRC generator 528 and is written onto the disk in place of word 35 which is a 00(16) byte as initialized in dual ported sector RAM 241.

Having written CRC 1 and CRC 2 for the ID field, the process then continues to write out three bytes of 00(16)'s from locations 36 through 38 which are the first three bytes of gap 2. When word 39, which contains a 4E(16) data byte is loaded into shift/storage register 504, a counter in disk/data timing and control logic 239 expires indicating that the last byte of data loaded into shift/storage register 504 is to be recirculated and be continually written onto the disk untfl the expiration of another counter. This byte of 4E(16) is chosen for the gaps because it is a good pattern on which to lock the phased locked loop data separator used in Winchester data interface logic 251. The recirculation of the last byte of data from dual ported sector 241 is accomplished by recirculating signal RECIR on line 508 selecting the A input of 2 to 1 multiplexer 254 such that the data appearing on the A input will appear on the Y output on line 522 and be entered into the serial input (SL) of shift/storage register 504. This recirculation has been occurring for all previous words of data loaded into shift/storage register 504 but was overridden by the loading of a fresh byte of data from dual ported sector RAM 241 by the load/shift signal on line 510 every eight bit clocks. Therefore, when the first counter expires upon the loading of the byte 39 into shift/storage register 504, the periodic loading is inhibited and the recirculating mode of operation is entered.

At this time, microprocessor 231 is removed form the hold state and is free to update the contents of dual ported sector RAM 241. Microprocessor 231 goes back and increments byte 33 to the next sector number of the sector which will be formatted on the disk. Once this incrementing of the sector number in location 33 has been accomplished, the microprocessor is again placed in the hold state while the 4E(16) byte of data from location 39 is written on to the disk for the completion of gap 2, all of the data field and the first three bytes of gap 3. After the first three bytes of gap 3 have been written onto the disk another counter expires indicating that all but the end of gap 3 of one sector of data has been written to the disk.

At this point, incrementing address register 566 is reset by the reset signal on line 568 at the clear (CLR) input and the process is started over with location 0 of dual ported sector RAM 241 being loaded into shift/storage register 504. The second sector of data is then formatted onto the Winchester disk 201. This process is repeated until 32 sectors of data have been written in the track being formatted on the disk. During the second and subsequent sectors within the track, bytes 0 through 14 are used to complete the writing of gap 3 instead of the writing of gap 1 which appear only at the beginning of a track. After 32 sectors have been written on the track, a further counter expires and instead of inhibiting the circulation of the last byte of data and resetting incrementing address register to location 0 the recirculation is allowed to continue such that 4E(16) bytes will be written until the track index mark is encountered. The track index mark terminates the writing of the track with the writing of gap 4.

Placing microprocessor 231 in the hold mode places bus outputs of the microprocessor in the high impedance state so that bus 229 can be used by other logic in disk controller 105 without interference. Placing microprocessor 231 in the hold mode when dual ported memory 241 is being accessed by parallel/serial bidirectional shift register 243 also guarantees that there will never arise a condition in which access by register 243 to memory 241 will be inhibited because of a memory access being made by microprocessor 231. This simplifies the logic and reduces the need for any buffering between memory 241 and register 243 that would otherwise be required due to the fast disk transfer data rates.

A comparison of FIG. 4A with the track format shown in FIG. 3 will show that upon the completion of the first pass of the formatting operation, the gap 1 has been written with the final data, the sync field has been written with the final data, the ID field has been written with the final data including the proper generation of the CRC 1 and CRC 2 cyclical redundancy checks, the first three bytes of gap 2 have been written with the final data. The remainder of gap 2, the complete data field including CRC 1 and CRC 2 and the first three bytes of gap 3 have been written with the value of 4E(16). The remainder of gap 3 has been written with its final data and gap 4 has been written with its final data. Therefore, what remains to be written with the final data is the end of gap 2, the data field and the beginning of gap 3. All of this data is updated during a write update operation which will be done during second and third pass of the format operation.

In reviewing FIG. 4A, it can be seen that locations 31, 32 and 33 must be initialized by the microprocessor 231 to contain variable data. Location 31 contains the cylinder number of the track that is being written and it is a value of 00(16) to FF(16) (i.e., 0 to the 255 decimal). Location 32 contains the head number of the surface being written and will contain a value for 00(16) to 03(16). Location 33 will contain the sector number of the sector that is being written and will contain a value of 00(16) to 1F(16) (i.e., 0 to 31 decimal). During the formatting of any given track which takes place in the three passes, only location 33 which contains the sector number needs to be updated as each sector is written during the writing of any one track because the cylinder and head numbers of all sectors within one track are the same.

After pass 1 of the disk formatting operation is completed, passes 2 and 3 are written. During pass 2 and 3, the data field of half of the sectors are written. For example, during pass 2 the data fields of all of the even numbered sectors are written and during pass 3 the data fields of all of the odd numbered sectors are written. During passes 2 and 3, in addition to writing the data fields, the end of gap 2's and the beginning of gap 3's are written as can be seen by the amount of data that is written during a write update as illustrated in FIG. 3.

Prior to the beginning pass 2 of the format operation, microprocessor 231 initializes dual ported sector RAM 241 to contain the data pattern illustrated in FIG. 4B. The data in dual ported sector 241 is used in two ways in passes 2 and 3. Bytes 0 through 9 are used to locate the sector to be written and bytes 10 through 284 are used to write the sector onto the disk. Locations 0 through 6 contain the ID field of the sector which is to be written and are initialized to contain the ID address mark, the cylinder number of the cylinder which is to be written, the head number of the head which is to be used to write on one surface of the cylinder and the sector number of the sector within the track which is to be written. Locations 5 and 6 are initialized to contain 00(16)'s for the cyclical redundancy check character but these bytes are effectively ignored and the cyclical redundancy check character generated by CRC generator 528 is compared with the cyclical redundance check character read from the disk. Locations 7 through 9 contain the 00(16) bytes which are the first part of gap 2. Locations 10 through 21 contain twelve 00(16) bytes which are to be written onto the disk to complete the end of gap 2. Locations 22 and 23 contain the data address mark. Locations 24 through 279 contain 256 bytes of 00(16) data which are to be written as the user data within the data field so that the user data will be initially set to all zeros. Locations 280 and 281 are initialized to 00(16)'s but will be replaced in the data stream to the disk with the cyclical redundancy check character generated by CRC generator 528 which will be the actual information written onto the disk. Locations 282 through 284 contain three bytes of 00(16) data which are written onto the disk to initialize the beginning of gap 3 to its final value.

During passes 2 and 3 of a disk formatting operation, which is similar to a disk normal write operation and normal read operation, the disk/data timing and control logic 239 controls the locating of the sector to be written or read. This sector locating operation takes place after the microprocessor 231 has initialized dual ported sector RAM 241 to contain the ID field of the sector to be located and the user data to be written on memory if a write is involved. Once microprocessor 231 is placed in the hold mode, the sector locating operation begins. During the sector locate phase of passes 2 and 3, the read head within Winchester disk 201 associated with the track on which the sector that is to be located resides, is turned to the read mode. As data is read from the disk, Winchester data interface logic 251 detects the occurrence of both gap 1 or the end of gap 3 both of which consists of 15 bytes of 4E(16) data. This 4E(16) bit pattern is chosen because it is a good pattern for the phased locked loop circuitry within the Winchester data interface logic 251 to become locked onto. This same 4E(16) bit pattern was used to temporarily initialize the data field of the sectors during pass 1 for this same reason.

Once the phased locked loop circuitry becomes locked onto the data being read from the disk, the Winchester data interface logic 251 begins to look for the occurrence of the "A1" address mark. When this occurs, the Winchester data interface logic 251 signals compare and CRC logic 249 that a comparison should begin between the ID field being read from the disk which appears on line 526 and the data coming from a dual ported sector RAM 241 which will appear on line 544. Therefore, once the end of the sync field is detected, incrementing address register 566 is reset so that it addresses location 0 of dual ported sector RAM 241 which loads the shift/storage register 504 via line 50 with the first byte of data of the ID field. As each bit clock occurs, the data is shifted out on line 506 which is selected as the input of multiplexer 542 and therefore appears on line 544 as data to the disk. However, in this case of sector locating, the data is not actually transferred to the disk because a read operation is in progress.

During this sector locate phase of a pass, the data from the disk appearing on line 526 at one input of exclusive OR 564 can be compared with the data which is coming from memory 241 and appearing on line 544 at the other input of exclusive OR 564. As long as there is a bit for bit match of the data to the disk with the data from the disk, the output of exclusive OR 564 on line 562, signal DCMPRG, will be a binary ZERO and the output of AND gate 558 on line 554, signal CMPENBG, will be a binary ZERO.

The output of AND gate 558 is enabled by compare begin signal COMPBEBQ on line 560 being a binary ONE during the time that a comparison is to be made between the data from the disk with the data to the disk. As each bit of data is read from the disk, bit clock (CLK) signal on line 556 at the clock (CLK) input of compare flip-flop 546 clocks the output of the comparator which appears at the data (D) input thereof thus assuring that flip-flop 546 will remain in the reset state so that the compare error signal COMPERR on line 548 at the Q output will remain a binary ZERO as long as there is a bit by bit match of the data coming from dual ported sector RAM 241 with the data coming from Winchester disk 201.

Once there is a mismatch, compare flip-flop 546 will become set and the Q-bar output signal DFENL on line 550, which is connected back to the preset (PR) input, will assure that the compare flip-flop remains set until cleared by a signal AMFH appearing at the clear (CLR) input on line 552. It being noted that before the sector locate operation was begun, compare flip-flop 546 was cleared by signal AMFH on line 552. The occurrence of the compare error signal on line 548 is used to reset the Winchester data interface logic 551 to again look for a gap 1 or a gap 3 data pattern followed by a sync pattern and then followed by and ID field from the disk which matches the ID field from dual ported sector RAM 241.

This mismatch of data will occur during a pass 2 or pass 3 of the formatting operation if the sector number of the sector currently being read from the disk is not the same as the sector number contained in location 4 of the dual ported sector RAM 241.

If location 0 through 4 in dual ported sector RAM 241 match the data coming from the disk, which appears on line 526, the output of CRC generator 528 is multiplexed onto line 544 by the CRC control signal on line 532 selecting the B input to be output to the Y output of multiplexer 542. It being noted that CRC generator 528 was generating the CRC based upon the data received at the data input from lines 506 for bytes 0 through 4. If the CRC characters generated by CRC generator 528 match the CRC found in the data from the disk, after receiving the three 00(16) bytes which comprise the beginning of gap 2 and match the data stored in locations 7 through 10 of dual ported sector RAM 241, the disk/data timing and control logic 239 can safely assume that the current sector being read from Winchester disk 201 is the same as the sector addressed by the ID field stored in dual ported sector RAM 241.

At this point in time, disk/data timing and control logic 239 changes the mode of operation from a read mode which occurs during the sector locate phase of passes 2 and 3 to a write mode of operation and the data in locations 10 through 284 is written onto the disk in a manner similar to that used to write the data during pass 1 of the format operation. During this portion of pass 2 and pass 3, the second part of gap 2 is initialized to its final 00(16) value, by writing the words in locations 10 through 21 onto the disk, the data address mark contained in locations 22 and 23 is written on the disk, and a user data field of 256 bytes in initialized to an all zero value. After writing location 279 onto the disk, the output of CRC 528 is multiplexed onto line 544 and the two byte (16 bit) cyclical redundancy check is written onto the disk. Following the writing of the cyclical redundancy check, the three bytes of 00(16) are written onto the disk from locations 282 through 284 thus completing the initialization of the beginning of gap 3 to its final value.

At this point in time, the one completed sector has been initialized and the microprocessor 231 is removed form its hold mode and allowed to update location 4 to indicate the next sector to be initialized. Because of the relative speeds between the rate at which the data is transferred to or from the disk and the speed of the microprocessor in its ability to update location 4 in dual ported sector RAM 241, every other sector is written during pass 2 and pass 3 such that when microprocessor 231 updates the location 4 it increments it by 2 so that during pass 2 all of the even numbered sectors are written and during pass 3 all of the odd numbered sectors are written.

Once having updated location 4 in dual ported sector RAM 241, the microprocessor is again put in the hold mode and a sector locate operation is initialized. When the next sector to be written is located, the writing of the data field takes place as described above. Once all 16 of the even numbered sectors are written during pass 2 the 16 odd numbered sectors are written during pass 3. Once the disk is completed formatted by performing all three passes on each track within the disk, the disk is then available to peform normal read and write operations. A normal write operation is very similar to that described above for pass 2 and pass 3 of the format operation with the exception that locations 24 through 279 will contain the actual user data which is to be written within a sector as shown in FIG. 4B.

As described above, each sector locate operation is performed during pass 2 or pass 3 of a format operation or during the single pass of a normal read or write operation. Each time a mismatch is found between the ID field located in dual ported sector RAM 241 and the data coming from Winchester disk 201, the incrementing address register 566 is reset to address memory location 0 by the reset signal on line 568 which appears at its clear input. During a normal sector read or a normal sector write operation, the logic in FIG. 5 operates in a manner same as that described above for passes 2 and 3 of the disk formatting operation.

During a normal sector write operation, the write head is activated and locations 10 through 284 containing the end of gap 2, the actual user data and the beginning of gap 3 are written onto the disk along with the cyclical redundancy check characters generated by CRC generator 528 which are also written onto the disk. Thus, during a normal sector write operation, dual ported sector RAM 241 need contain only the contents being initialized in locations 0 through 284 (see FIG. 4B). During a normal sector read operation which is similar to the normal write operation, for locations 0 to 9 at which point the logic looks for the data address mark. Upon detection of the data address mark, the data input multiplexer 524 is selected to multiplex the B input onto the Y output such that the data coming from the disk on line 526 will enter the serial input (SL) of shift/storage register 504 and once the full eight bits of one byte have been assembled in it, the data is transferred over line 502 to be written into dual ported sector RAM 241. Thus, the data from the disk will be written into locations 10 through 265 of dual ported sector RAM 241 with the 12 bytes of 00(16) at the end of gap 2 not being written (see FIG. 4B). During a normal sector read operation, after all 256 bytes of the user data have been read into dual ported sector RAM 241, the error (ER) output of the CRC generator 528 on line 541 will be checked to see if a CRC error occurred.

From the above discussion, it can be appreciated that the present invention in which a parallel to binary shift register is used in a recirculating mode allows access to the dual ported sector RAM 241 during portions of the passes 1, 2 and 3 of the format operation under conditions that would normally not be available to microprocessor 231 if the recirculating mode of operation was not employed. Thus, by recirculating the pattern within shift/storage register 504, the microprocessor 231 can access dual ported sector RAM 241 and update the sector number so that sequential sectors may be written with correct sector numbers in one continuous write operation. This freeing up of memory 241 for updating by microprocessor 231 allows dual ported sector RAM 241 to be considerably smaller than would otherwise be required if it was necessary to contain a complete track's worth of information in order to write pass 1 of a format operation.

The above discussion has been in terms of the formats used on the Winchester disk 201. In addition to the Winchester disk 201, the disk controller 105 is capable of having a floppy disk 203 attached to it. Floppy disk 203 may be either a single density or double density floppy disk. Whereas the Winchester disk described above has a soft sectored format (i.e., the beginning of the sectors are not defined by holes in the platter), the floppy disk has a hard sectored format. The format used on the single density diskette, which is recorded using a frequency modulation (FM) encoding technique, is different from that found on the double density diskette which is encoded using a modified frequency modulation (MFM) encoding technique. Table 1 below shows the sector format for the single density floppy disk and Table 2 shows the format of a sector of the double density diskettes.

TABLE 1

Floppy Disk Single Density Format
Frequency Modulation (FM) Encoding

| | |
|---|---|
| 15X00(16) | Gap 1 allows for drive tolerance (15 bytes). |
| FF(16) | Address mark (1 byte). |
| TRK | Track number byte between 00(16) to 4C(16) for single sided media and 00(16) to 99(16) for double sided media (1 byte). |
| SEC | Sector number byte between 00(16) to 1F(16) (1 byte) |
| Data | 128 bytes of user data (128 bytes). |
| CRC 1 | Cyclic redundancy check |
| CRC 2 | bits created by controller using a polynominal $X(16) + X(15) + X(14) + X + 1$ on address mark, track, sector, and data bytes (2 bytes. |
| 00(16)'s | Gap 2 of 00(16) generated by controller. The gap length is determined by drive and media tolerances. |

TABLE 2

Floppy Disk Double Density Format
Modified Frequency Modulation (MFM) Encoding

| | |
|---|---|
| 32XFF(16) | Gap 1 sync bytes for phased locked loop data separator (32 byte). |
| D0(16) | Address mark (1 byte). |
| TRK | Track number byte between 00(16) and 4C(16) for single sided media and 00(16) to 99(16) for double sided media (1 byte). |
| SEC | Sector number byte between 00(16) and 1F(16) (1 byte). |
| Data | 256 bytes of user data (256 bytes). |
| CRC 1 | Cyclic redundancy check |
| CRC 2 | bits created by controller using polynominal $X(16) + X(15) + X(2) + 1$ on address mark, track, sector and data bytes (2 bytes). |
| FF(16)'s | Gap 2 of FF(16) generated by controller. The gap length is determined by drive and media tolerances. |

By examining Tables 1 and 2 and comparing their format with the format for the Winchester disk shown in FIG. 3, it can be appreciated that for a single controller to be able to write all three formats a large amount of logic would be required to enable the various counting operations required to write and read these differing formats. In addition, even to write a single format would require a wide variety of counters just to perform the various formatting, reading and writing operations used in a single format.

In the preferred embodiment, this problem of having to provide for the writing of a wide variety of sector formats is solved by the use of a programmable counter within disk/data timing and control logic 239. Turning now to FIG. 5, the operation of programmable counter 572 will be discussed in greater detail. In the preferred embodiment programmable counter 572 is an Intel type 8253 programmable counter/timer chip which is designed for use as an Intel microcomputer peripheral. This counter is described in the Intel publication entitled, *Intel Component Data Catalogue* 1979, copyrighted 1979, which is incorporated herein by reference.

Programmable counter 572 is organized as three independent 16-bit counter each of which counts at a rate up to 2 megahertz. Various modes of operation of the counter are programmable. Data bus 590 is an 8 bit bidirectional tristable bus that is used to interface program counter 572 with the data bus portion of bus 229 of disk controller 105. Data bus 590 is used to program the modes of programmable counter 572 under the control of microprocessor 231. Data bus 590, connected to the D0 to D7 inputs/outputs, is also used to load each of the three 16-bit counters and to read each of the three count values. Read/write logic within programmable counter 572 accepts inputs from the data bus and in turn generates control signals for overall counter operation. This read/write logic is enabled or disabled by a select signal on line 580 appearing at the CS input of programmable counter 572 so that no operation can occur or change the function of the programmable counter unless the counter has been selected by the disk controller logic. When signal MPRD on line 592 at the read (RD) input is in the binary ZERO state, it indicates that microprocessor 231 is reading data from one of the three counter values in programmable counter 572. When signal MPWR on line 594 at the write (WR) input is in the binary ZERO state, it indicates the microprocessor 231 is outputting data in the form of mode information or loading one of the three independent counters in programmable counter 572. Signal CNTRA on line 596 at the A0 and A1 inputs is a 2-bit address signal which is used to select one of the three counters to be operated on and to address the control word register for mode selection of programmable counter 572. When the select signal on line 580 is in the binary ZERO state, it enables the programmable counter 572 to perform a read or write of information onto data bus 590.

Counters 0, 1 and 2 of programmable counter 592 are three independent 16 bit counters which are identical in operation. Each counter consists of a single, 16-bit, pre-settable, down counter. Each counter is enabled by an enable signal appearing at its gate (G0, G1 or G2) input. Each counter decrements by one each time a clocking signal appears at its clock (CLK0, CLK1, or CLK2) input. When a counter counts down to zero, the signal appearing at its output (Q0, Q1 or Q2) changes state. In the preferred embodiment of disk controller 105, programmable counter 572 is used to count the number of bytes that are being read from or to dual ported sector RAM 241. Each of these counters is clocked by the byte clocking signal appearing on line 584.

In the preferred embodiment, counter zero is used to determine the length of the ID field if a soft sectored format is being used (i.e., a Winchester type disk) and it is used to determine the length of the entire data field if a hard sectored format is being used (i.e., a floppy disk). In the case of a floppy disk, counter zero can be set up either to 128 or to 256 characters depending upon whether a single or double density disk, counter zero is being written. Counter 1 of programmable counter 572 is used when performing a format operation on a double density hard sectored disk or in a soft sectored disk. Counter 1 determines the length of the entire sector field. For the Winchester disk format shown in FIG. 3 a sector length of 314 bytes goes from the beginning of the sync field to the end of the gap 3 field but in actuality counter 1 is used to count from the beginning of gap 1 through the 3 zeros at the beginning of gap 3. Counter 2 is used in a normal read or write operation of a soft sectored disk to determine the length of the data field, that is, from the beginning of the data address mark through the end of the cyclic redundancy check character 2 in FIG. 3. Counter 2 is not used in a hard sectored format because in the hard sectored format the sector consists of a single field that is a combined ID and data field so that the sector is treated as if it as one long ID field and counter 0 is used to determine its length. During a format operation of a soft sectored disk, counter 1 and counter 2 are the only counters that are used. The values placed in counter 1 and counter 2 determine the sector length that is formatted on the disk and by setting them to predetermined values, the variable sector lengths can be formatted onto a soft sectored disk.

This ability to use counters in programmable counter 572 in the manner of formatting in reading and writing to the disk allows a great deal of flexibility with a minimum of other hardware being required withing disk/data timing and control logic 239. Therefore, the counters in programmable counter 572 are set up depending upon the type of operation and the type of device that is going to be accessed. The count values normally will be different for the different types of operations. During a read operation, the counts are different than when doing a write operation to the same disk because the amount of data that is transferred. This can be seen from the above discussion of the second and third passes of a formatting operation to a Winchester type disk and the difference between a read and write operation.

For example, in a write operation to the soft sectored disk, not only is the data field transferred to the disk but the end of gap 2 and the beginning of gap 3 are also transferred to the disk, whereas during a read operation only the data address mark and the data field itself including the CRC are transferred. Read operations normally transfer less data than write operations. This is because that during a read operation the gaps which preceed the data address mark are not read and they serve the purpose of synchronizing the phase locked loop data separators so the data can be recovered from the disk. In the preferred embodiment, the counts for programmable counter 572 are loaded by microprocessor 231 from a table that is stored in the controller program in ROM 237. It is the responsibility of the controller firmware to determine the type of operation to be performed and to load counters 0, 1 and 2 from a table in ROM 237 depending upon the type of disk and the type of operation to be performed on that disk.

Returning now to FIG. 5 and a discussion of the use of programmable counter 572. Counter 0 is enabled by signal ID enable on line 582. Once enabled, counter 0 counts the number of byte clock signals occurring on line 584 and when the predetermined count is reached, the output signal ID terminate on line 574 from the Q0 output goes to a binary ZERO indicating the count has been reached. Similarly sector enable signal on line 586 is used to enable counter 1 and when its predetermined count is reached, the sector terminate signal on line 576 from the Q1 output goes to the binary ZERO state. In a similar manner, the data enable signal on line 588 enables counter 2 which when its predetermined count is reached, the data terminates on line 578 from the Q2 output goes to the binary ZERO state.

Although each of the three independent counters are clocked by the byte clocking signal on line 586, all three counters are not enabled simultaneously. Enabling of the individual counters depends upon the events that they are being used to count and the various enabling signals on line 582, 586 and 588 are generated by other logic in the disk/data timing and control logic 239, which is not shown in FIG. 5.

For example, during a transfer operation to soft sectored Winchester type disk, counter 0 is used to count the bytes of information in the ID field and when the ID terminate signal on line 574 goes to the binary ZERO state, it goes into additional combinational logic which depending on the type of disk operation being performed will enable counter 2 which is used to count the number of bytes of information in the data field. For example, if a disk read or write operation is being performed to a soft sectored disk, counter 0 is used to select length of the ID field. Each ID field, as it is read from the disk, is compared with the ID field stored in dual ported sector RAM 241 to see whether it is the desired sector. If a favorable comparison between the ID field on the disk and the ID field stored dual ported sector RAM 241 is made, then counter 2 is enabled to either transfer the information from dual ported sector RAM 241 to the disk during a write operation or to read the information from the disk and write it into dual ported sector RAM 241.

Because the counters in programmable counter 572 cannot keep up with the data rate at which individual bits of data are transferred to and from the disk, counters within programmable counter 572 are used only to count byte transfers. Therefore, the outputs of programmable counter 572 appearing on lines 574, 576 and 578 are used to enable finer granularity bit counters which can be then fully decoded to determine finer bit positions within bytes of interest. These finer granularity bit counters are used within disk/data timing and control logic 239 when high resolution is needed and programmable counter 572 is used to set up the gross timing and control signals.

As can be appreciated from the above discussion, the use of programmable counter 572 within the peripheral controller allows great flexibility in the various formats of sectors that can be read or written by a single peripheral device controller. This gives a single device controller the ability to write variable length sectors or write a wide variety of sector lengths. In addition, it permits all different types of peripheral operations (formatting, reading and writing) to be handled with the minimum amount of combinational logic.

Although the preferred embodiment has been described primarily in terms of a disk controller, the present invention can be used in other applications where there are multiple units of data to be transferred.

While the invention has been shown and described with reference to the preferred embodiment thereof, it will be understood by those skilled in the art that the above and other changes in form and detail may be made therein without departing from the spirit and scope of the invention.

What is claimed is:

1. The method of generating a repetitive serial pattern using a recirculating shift register to reduce the amount of memory that would otherwise be required to hold a complete data pattern, said method comprising the steps of:
   a. initializing the memory to contain a subset of the complete data pattern to be serialized;
   b. reading a unit of data from the memory;
   c. loading the unit of data into a parallel to serial shift register;
   d. performing a parallel to serial conversion of the unit of data by shifting the unit of data in the shift register one bit at a time under the control of a bit clocking signal until all bits in the unit of data have been shifted out of a serial output of the parallel to serial shift register;
   e. returning to step b and reading the next unit of data from the memory under the control of a unit clocking signal until the last unit of data is read from the memory;
   f. detecting when the last unit of data is read from the memory and inhibiting the further loading of a unit of data from the memory into the parallel to serial shift register; and
   g. recirculating the last unit of data in the parallel to serial shift register by connecting the serial output to a serial input of the shift register, and continuing to recirculate the last unit of data and shifting out bits under control of the bit clocking signal until no more bits of data are required as determined by a count of the number of units of data output by the parallel to serial shift register.

2. The method of claim 1 wherein said initialization of the memory is performed under the control of a microprocessor.

3. The method of claim 1 wherein the serial bit stream output by the parallel to serial shift register is used to format a disk.

4. The method of claim 1 wherein the detection of the reading of the last unit of data from the memory is done by detecting the expiration of a counter that is preset with the number of units of data in the memory and clocked each time a unit of data is loaded into the parallel to serial shift register.

5. The method of claim 2 wherein during the recirculation of the last unit of data in the parallel to serial shift register, the memory contents are updated and the process is restarted at step b following the memory update.

6. The method of claim 5 wherein the updating of memory and the restarting of the process is repeated a predetermined number of times during the formatting of one complete track of a disk peripheral device.

7. The method of claim 6 wherein conflicts that might arise between the microprocessor and the parallel to serial shift register attempting to simultaneously access the memory are eliminated by putting the microprocessor in a hold state from the time that the parallel to serial shift register is loaded with a first unit of data read from the memory until the time that the parallel to serial shift register is loaded with the last unit of data read from the memory.

8. An apparatus for generating a repetitive serial pattern using a recirculating shift register comprising:

a. a parallel to serial shift register having a serial output coupled to a serial input of said shift register;
b. a memory capable of containing a plurality of units of data, an input/output port of said memory coupled to a parallel input/output port of said shift register;
c. an initialization means for initializing the contents of said memory to contain said plurality of units of data;
d. an incrementing address means having an address output coupled to an address input of said memory;
e. a data unit clock generating means coupled to a count input of said incrementing address means;
f. a bit clock generating means coupled to a clocking input of said parallel to serial shift register; and
g. a load signal generating means coupled to a load input of said parallel to serial shift register whereby consecutive units of data are read from said memory and loaded into said parallel to serial shift register one unit of data at a time and serially shifted out of said serial output of said parallel to serial shift register to produce a serial bit stream until one complete unit of data has been shifted out one bit at a time in response to said bit clock generating means at which time said data unit clocking means causes said incrementing address register means to increment and causes said load signal generating means to load a next unit of data from said memory into said parallel to serial shift register and then said next unit of data is shifted out to continue production of said serial bit stream.

9. The apparatus of claim 8 further comprising a CRC generator having a serial input coupled to the serial output of said shift register.

10. The apparatus of claim 9 further comprising a first multiplexer having a first input coupled to a CRC output of said CRC generator and a second input coupled to the serial output of said shift register, said first multiplexer having an output for data to a disk.

11. The apparatus of claim 10 further comprising a comparator having a first input coupled to the output of said first multiplexer and a second input coupled to a serial input stream from said disk and having an error flip-flop connected to the output of said comparator.

12. The apparatus of claim 11 further comprising a second multiplexer having a first input coupled to said serial output of said shift register and a second input coupled to said serial input stream from said disk, and said second multiplexer having an output coupled to said serial input of said shift register.

* * * * *